Sept. 27, 1938. C. O. FAIRCHILD 2,131,346
METHOD OF AND MEANS FOR RECORDING ON A STRIP CHART
Filed July 31, 1937 3 Sheets-Sheet 1

Witness:
Ed S. Smith, Jr.

INVENTOR.
Charles O. Fairchild
By Briesen Schrenk
ATTORNEYS.

Sept. 27, 1938. C. O. FAIRCHILD 2,131,346
METHOD OF AND MEANS FOR RECORDING ON A STRIP CHART
Filed July 31, 1937 3 Sheets-Sheet 2

INVENTOR.
Charles O. Fairchild
By
ATTORNEYS.

Witness:
Ed J. Smith Jr.

Sept. 27, 1938.　　　C. O. FAIRCHILD　　　2,131,346
METHOD OF AND MEANS FOR RECORDING ON A STRIP CHART
Filed July 31, 1937　　　3 Sheets-Sheet 3
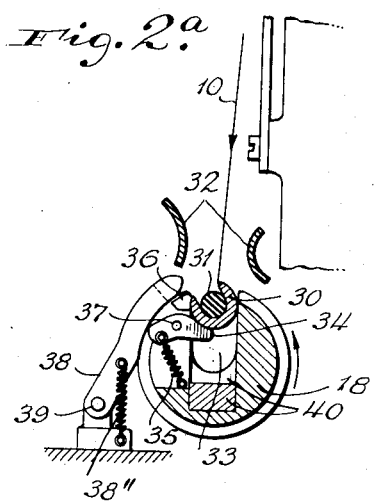
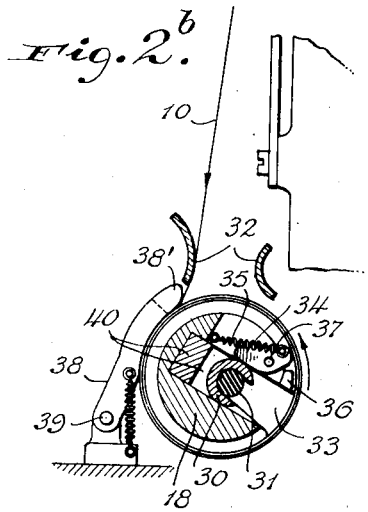
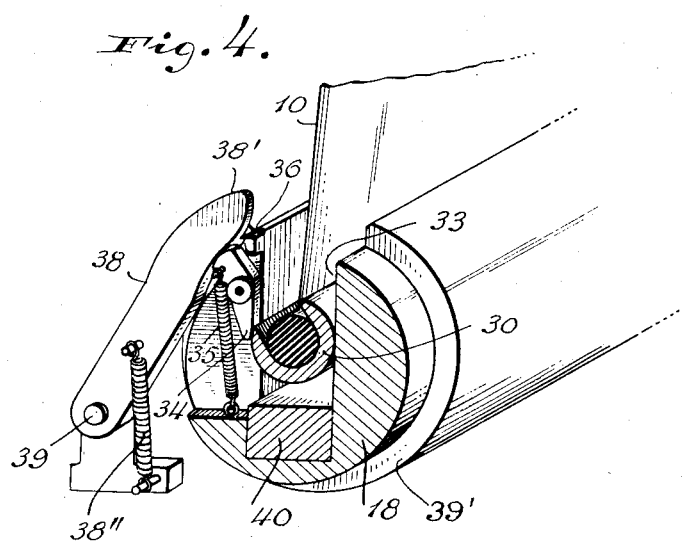
WITNESS:
Ed J. Smith, Jr.
INVENTOR.
CHARLES O. FAIRCHILD
BY
ATTORNEYS Patented Sept. 27, 1938

2,131,346

UNITED STATES PATENT OFFICE 2,131,346

METHOD OF AND MEANS FOR RECORDING ON A STRIP CHART

Charles O. Fairchild, St. Albans, N. Y., assignor to Charles J. Tagliabue Mfg. Co., Brooklyn, N. Y., a corporation of New York Application July 31, 1937, Serial No. 156,621

13 Claims. (Cl. 234—76)

This invention relates to recording instruments in which a strip chart having time graduations is moved at a rate corresponding to such graduations past a marking device, or stylus, which is positionable laterally in accordance with the value of the variable being recorded. In particular the invention relates to a method of and means for effecting automatic grasping of the advancing and manually weighted end of the strip chart by a reroll spool without wastage of the chart, following the severing of the strip and removal of the used portion.

It is the general object of the invention to provide an improved method of and means for causing the reroll spool to grasp and anchor the advancing end of the residual portion of a severed chart, whereby the manually-weighted chart end is reliably and automatically secured to the reroll spool and the normal operation of the chart mechanism continues without interruption.

It is a further and more specific object of the invention to incorporate within the reroll spool the mechanism for securing the chart end to the spool.

It is also an object of the invention to provide improved paper guiding means for insuring proper cooperation between the advancing end of the chart and the reroll spool and mechanism associated therewith.

Other objects of the invention will appear to those skilled in the art from the accompanying drawings and specification, in which are illustrated and described several embodiments of the invention. It is my intention to claim all that I have disclosed which is new and useful.

Figure 1:
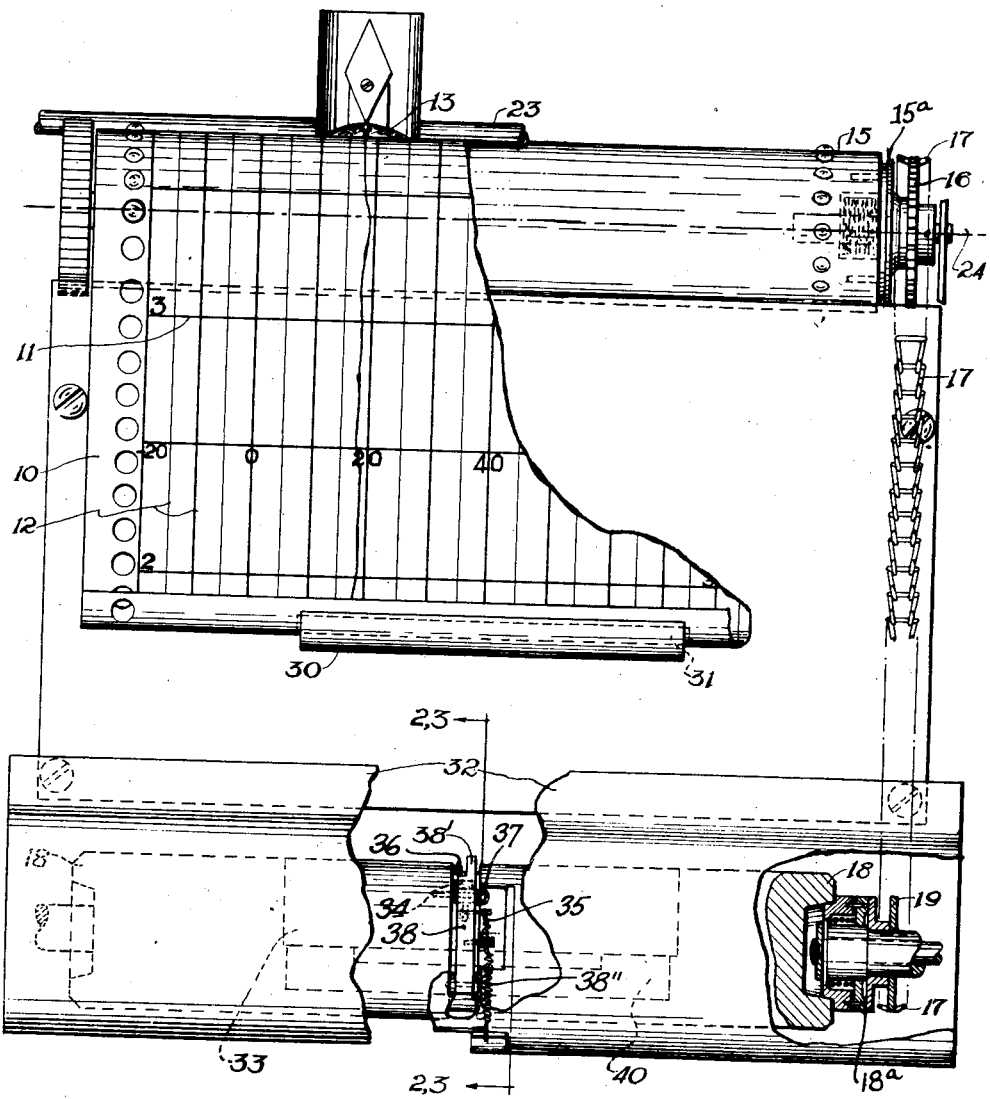
Figures 2, 3:
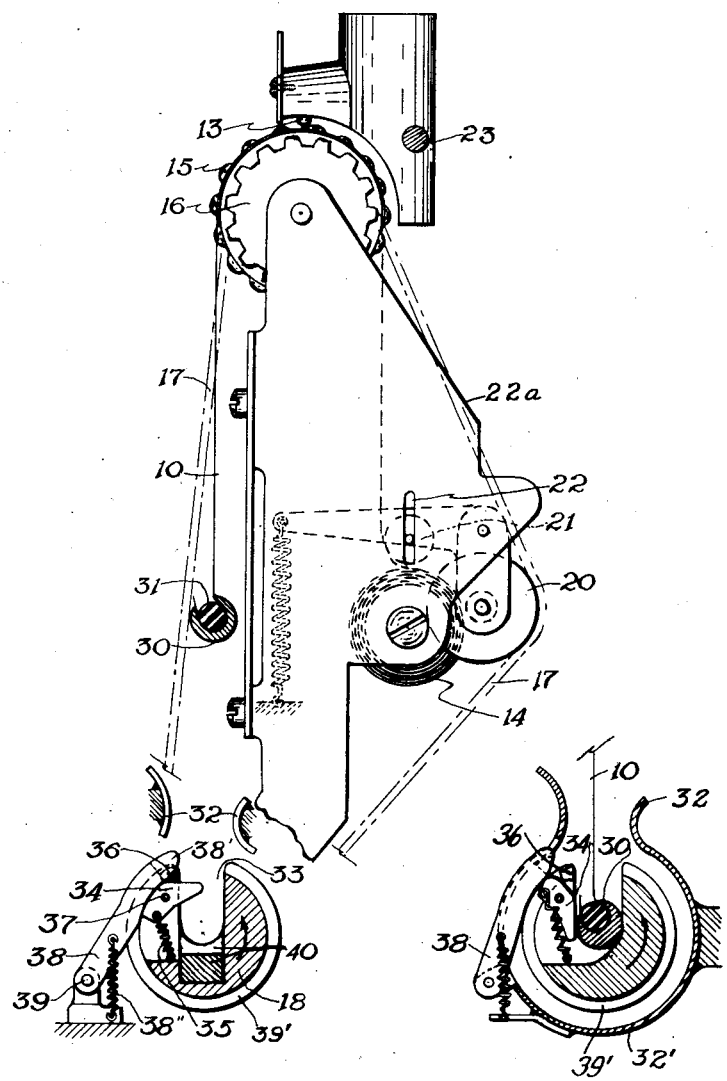

In the accompanying drawings, wherein like characters indicate like parts throughout: Fig. 1 is a front elevation, partly broken and partly in broken section, of part of a recording instrument embodying the invention; Fig. 2 is a corresponding end elevation, partly in section, showing the chart end approaching the reroll spool; and Fig. 3 is a generally similar view but showing the end of the chart at the moment of attachment to the reroll spool, a modified form of paper guard and an alternative form of non-magnetic reroll spool being illustrated. Figs. 2a and 2b are generally similar to Fig. 2 but show the parts in different relations from that of Fig. 2. Fig. 4 is a partially sectioned perspective view of the chart grasping portion of the reroll spool of the embodiment of Figs. 1 and 2 shown in the position of Fig. 3.

In the apparatus shown in the figures, the recording chart 10 has transverse time graduations 11 and longitudinal graduations 12 for the value of the variable being recorded by the marking pen 13. The chart is pulled from its supply spool 14 by timer roll 15, which is driven at a constant rate through a friction drive clutch 15a of known construction by way of a sprocket 16 which is rotated continuously by chain 17. Reroll spool 18 is likewise frictionally rotated by clutch 18a which is generally similar to clutch 15a, but (if free) at a slightly higher rate, by its sprocket 19, (which is slightly smaller in pitch diameter than is sprocket 16) also meshing with chain 17, the frictional torque (of clutch 18a) being considerably lower than that of clutch 15a for driving the timer roll so that the reroll spool will function reliably in synchronism with the timer roll, except when the operator exerts a superior torque in manually turning the reroll spool, as when initially setting the chart graduations to the corresponding time in starting a new roll. Sprocket 19 is thus driven at a constant rate, slightly faster than that of sprocket 16, by a clock motor (not shown) in a conventional manner, e. g., see U. S. Patent No. 1,967,080 to R. Dietze. A spring-tensioned idler pulley 20 takes up slack in the chain 17. A drag roller 21 rides on the chart 10 as it leaves the supply spool, its trunnions being held against lateral motion by the vertical sides of vertical slots 22 in the frame 22a. Guide rod 23 for the pen is parallel with the axis 24 of the timer roll, means (not shown) being provided for positioning the pen along the guide rod, the pen, in the type of mechanism selected for illustration, resting upon the moving chart by its own weight.

All of the above is more or less conventional, and no novelty is claimed therein. According to the invention I provide means for enabling the chart to be grasped automatically by the reroll spool, and in the illustrated embodiment of the invention this is accomplished in the following manner: The advancing end of chart 10, following severance of the latter, is slipped into the parallel-walled groove in cylindrical weighting element 30 and affixed therein by soft rubber rod 31 which is compressed by the parallel walls, the latter being spaced apart by a distance slightly less than the diameter of rod 31. In other words, resilient pressure and friction are employed to secure the chart end to the weighting element, although any equivalent releasable holding means may be used for this purpose. I preferably form weight element 30 of a magnetic material, e. g., iron, for a purpose to be disclosed later. In any case, this element is of sufficient weight to cause the chart to be pulled toward reroll spool 18, the axis of which lies directly underneath. Guide wings 32 lie on either side of the chart's path as it descends, being spaced apart enough so that weight 30 will drop easily through the space therebetween and into a radial slot 33 in the reroll cylinder.

In Fig. 2, a trigger 34 is shown in raised position within slot 33 under the action of a spring 35, the movement of the trigger on its pivot 37 being limited by stud 36. Detent latch 38 is pivotally mounted on fixed pin 39, and is held by spring 38'' against the reroll cylinder, the latch entering a circumferential groove 39' so that a cut-back end portion of latch 38 abuts a portion of stud 36 when the trigger is in the Fig. 2 position, i. e. when there is no paper on the reroll. The latch at this time rests against the depressed left end of trigger 34. In the position of the parts shown in Fig. 2, following the severance of the chart near the pen 13, the reroll spool always has time to turn far enough so that its stud 36 stops against the cut-back end portion of detent latch 38, before weight 30 drops far enough to reach the reroll spool. For this reason, it is unnecessary to provide a number of slots and detents for the reroll spool, although they could be used if desired.

Fig. 3 shows, in the alternative embodiment having a non-magnetic reroll spool the position of the parts after the weighting element 30 has dropped into the slot and pushed (from the slot) the projecting end of trigger 34 whose opposite end has, during such trigger motion, cammed the detent 38 out of engagement with the stud 36. The reroll spool, upon being thus released, starts to rotate. The extreme end 38' of detent latch 38 is rounded to ride smoothly over the surface of the chart as the reroll spool rotates, without tearing the paper. The inner intermediate surface of this latch is shaped to have a curvature which is substantially that of the reroll spool, the result of such construction being that, even if the end of latch 38 should break through the paper, its end could not possibly catch on the advancing opposite edge of slot 33. Such engagement is prevented also by the sled-runner action of the rounded end 38' of latch 38.

It will be noted that, in the position shown in Fig. 3, the left-hand end of trigger 34 is even with the surface of the reroll spool, the outer portion of stud 36 being slightly within the radius of this surface and the bottom of the circumferential slot 39' being still farther within it, the arrangement being such as to eliminate any possibility of the latch's falling into the slot 33 of the reroll spool. In other words, once detent 38 has been cammed out of the way by the lefthand (Fig. 3) end of trigger 34, its end 38' is held clear of the reroll spool until after the trailing edge of slot 33 has passed under rounded end 38' of the detent. Consequently the rounded end 38' rides smoothly over chart 10 while the latter is being wound around the reroll spool.

A permanent magnet 40 is fixed within the core of reroll spool 18 adjacent to its slot 33 so that the iron weight 30 acts as its keeper when in contact with the magnet. The latter is of such high strength as to retain firmly its keeper even when slot 33 is inverted.

As shown in Fig. 2, the guides 32 need not extend around the reroll spool when using a magnet to hold the weighting element. In the Fig. 3 construction, on the other hand, wherein no magnetic means are provided for anchoring the weighting element within the reroll spool, the inlet guides 32 are joined to a cylindrical guide portion 32' which extends about the spool, the portion 32' being close to the surface of the spool to keep the weight from dropping out of groove 33. This latter construction will, of course, reduce the space available for the chart.

The operation of the chart engaging reroll device above described is as follows: After the chart has been severed close to the pen and the used portion manually pulled out from the reroll spool by turning the latter backwards against the pull of its drive by slipping friction drive clutch 18a, the weight is removed from the used portion and attached to the advancing edge of the chart. The reroll spool is driven until its stud 36 is engaged by the cut-back end of detent latch 38, the latter then being in the Fig. 2 position, the spool stopping with the slot 33 opening upwardly, i. e., in the weight-receiving position, before the weight can reach it. In other words, the distance from timing spool 15 to reroll spool 18 is so great, relative to the forward speed of the end of chart 10, that the reroll spool is always stopped in its weight-receiving position before the weighted end of the chart can possibly reach the reroll spool, with the result that the chart is continuously under tension from the time when the weight is attached until the reroll spool is effective. As the timer roll continues to operate, the weighting element finally drops into the slot in the reroll spool, striking the trigger (Fig. 2a) and releasing the detent 38 as shown in Figs. 3 and 4 so that the reroll spool starts to turn; however, the weight drops fast enough relative to the advance of the edge of the slot so that the chart's iron weight contacts the magnet, in Fig. 4, and is firmly held by it, acting as its keeper. The weight is thus held against falling out as the slot turns around to an inverted position (Fig. 2b). The rounded end of the latch rides up on the chart and the reroll functions steadily until the chart is again severed and the above sequence is repeated.

It is to be understood that my claimed invention is applicable to other recorders than those in which the chart moves at constant speed, i. e., it may also be useful in other cases where a strip chart is employed. It is also within the scope of the claims for my invention to use other means, independent of the reroll spool, than a weight for holding the chart taut and advancing its end toward the reroll spool.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a recording instrument utilizing a recording means for marking a uniformly time-graduated recording strip chart, the combination with a chart supply spool, a chart rewinding spool, a constant-speed timer roll engaging the chart to continuously advance it at a constant average rate corresponding with the time graduations on the chart past the recording means, of weighting means adapted to be attached to the advancing end of the chart; and means rotatable with said reroll spool and adapted to automatically engage said weighting means when the latter reaches said engaging means; said engaging means being located beneath the weighted advancing end of the chart.

2. In a recording instrument including a chart supply spool, a chart reroll spool, a uniformly time-graduated recording strip chart, and marking means for producing a record on said chart, a combination with timing means for moving said chart past the marking means at an average rate corresponding to the time graduations on the chart, of a weight attachable to the advancing end of said chart below said timing means following a severance of the chart, and means for automatically engaging said weight with said reroll spool when said advancing chart end reaches it.

3. In a recording instrument including a chart supply spool, a chart reroll spool, a uniformly time-graduated recording strip chart, and marking means for producing a record on said chart, a combination with timing means for moving said chart past the marking means at an average rate corresponding to the time graduations on the chart, of a weight attachable to the advancing end of said chart below said timing means following a severance of the chart, said reroll spool being constructed to automatically interlock with the chart when the chart reaches it.

4. An apparatus as set forth in claim 1, in which the chart and weight engaging means includes a groove in the reroll spool disposed in the path of the weight, said groove having a gap sufficiently wider than the weight to enable the weight readily to enter the gap.

5. An apparatus as set forth in claim 1, in which at least a portion of the chart weighting means is composed of magnetic material and the engaging means includes a permanent magnet affixed to the reroll spool in the path of the chart weighting means.

6. An apparatus as set forth in claim 1, in which the weight engaging means includes a groove in the reroll spool disposed in the path of the descending weighting means, a trigger in said groove, pivotally mounted on the reroll spool and adapted to be actuated by the weight; and a detent latch arranged to hold the reroll spool stationary and so located adjacent to a movable portion of said trigger as to be released thereby from a spool-holding position while the weight is in the groove and engaging said trigger.

7. An apparatus as set forth in claim 1, in which the weight engaging means includes a groove in the reroll spool disposed in the path of the descending weighting means, a trigger in said groove, pivotally mounted on the reroll spool and adapted to be actuated by the weight; a detent latch arranged to hold the reroll spool stationary and so located adjacent to a movable portion of said trigger as to be released thereby from a spool-holding position while the weight is in the groove and engaging said trigger, and circumferential guard means, open at the top, for retaining the weight means in engagement with the reroll spool while the weight means is below the axis of the reroll spool and before its first complete turn has resulted in wrapping the weight means against the reroll spool by the chart.

8. In an apparatus for winding up a flexible sheet fed in a predetermined path, in combination, a weight adapted to be attachable to the advancing end of the sheet to cause it to descend in a fixed path, a normally rotatable spool having a groove for the weight, detent means for holding the spool against rotation with its groove in the path of the advancing weight, and means actuatable by the weight when in the groove for then releasing the detent.

9. Apparatus as set forth in claim 1, in which the recording means is so spaced from the reroll spool that the latter, when free, has time to complete more than one revolution before the timer roll advances the weighted end of the chart from a point of severance near the recording means to the reroll spool.

10. An apparatus as set forth in claim 1, in which the weight engaging means includes a groove in the reroll spool disposed in the path of the descending weighting means, a trigger in said groove, pivotally mounted on the reroll spool and adapted to be actuated by the weight; and a detent latch arranged to hold the reroll spool stationary and so located adjacent to a movable portion of said trigger as to be released thereby from a spool-holding position while the weight is in the groove and engaging said trigger, the reroll-spool holding end of said detent latch being shaped to ride harmlessly over the chart.

11. In a recording instrument utilizing a recording means for marking a uniformly time-graduated recording strip chart, the combination with a chart supply spool, a chart rewinding spool, a timer roll engaging the chart to continuously advance it at a constant average rate corresponding with the time graduations on the chart past the recording means, means free from the reroll spool for advancing the severed end of the chart toward the reroll spool, and means for anchoring the chart on the reroll spool when the severed end reaches the same.

12. The steps in the method of handling a strip chart that comprise independently guiding the advancing end of the chart, free of a reroll spool, toward the reroll spool, and automatically operatively engaging such end with the spool upon its arrival at the spool.

13. The steps in the method of handling a uniformly graduated strip chart having a free edge advancing toward a reroll spool, which comprises tensioning the free edge portion of the chart toward the reroll spool, automatically advancing it toward the reroll spool at a predetermined, constant average speed corresponding with graduations on the chart, and automatically operatively engaging such edge portion to the reroll spool when such portion reaches the reroll spool.

CHARLES O. FAIRCHILD.